June 3, 1924.
H. B. KIMMEL
SAW
Filed March 15, 1923
1,496,089
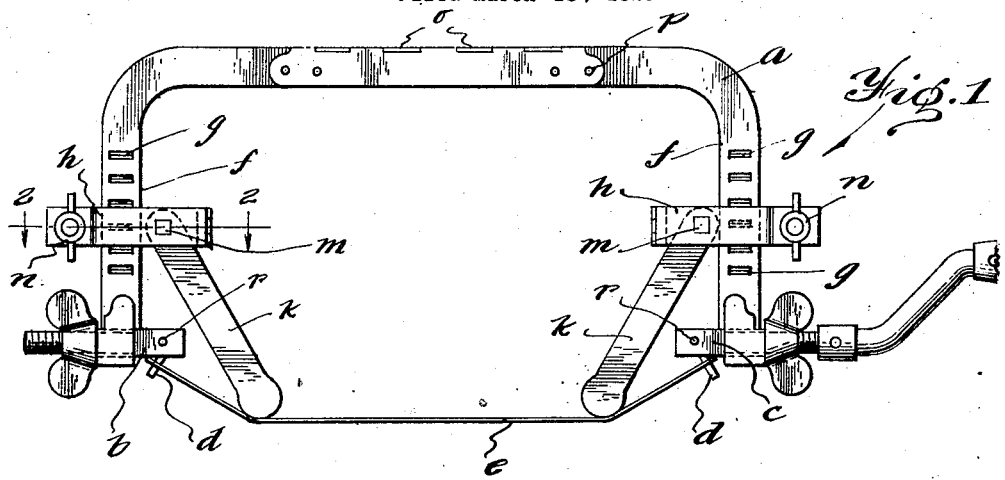
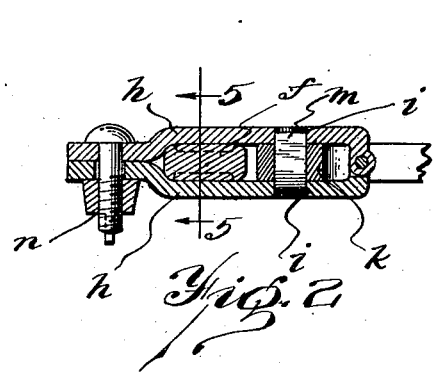
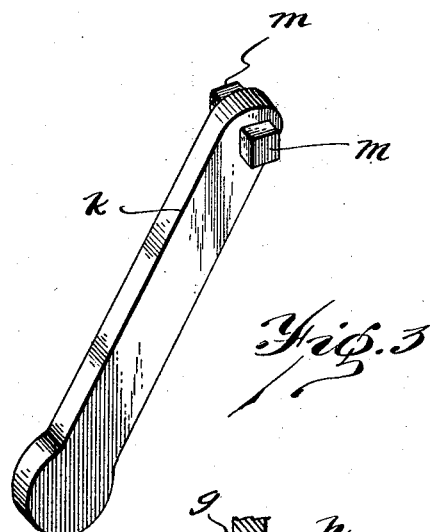
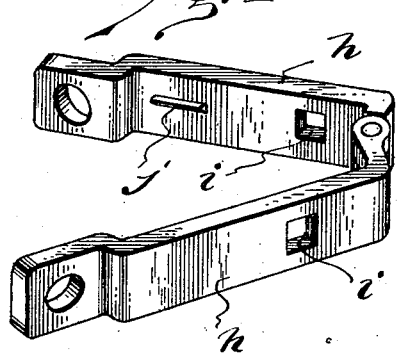
Inventor
Harry B. Kimmel
By Stuart C. Barnes
Attorney Patented June 3, 1924.

1,496,089

UNITED STATES PATENT OFFICE.

HARRY B. KIMMEL, OF HIGHLAND PARK, MICHIGAN.

SAW.

Application filed March 15, 1923. Serial No. 625,180.

*To all whom it may concern:*

Be it known that I, HARRY B. KIMMEL, a citizen of the United States, residing at 42 Gerald Avenue, Highland Park, in the county of Wayne and State of Michigan, have invented certain new and useful Improvements in Saws, of which the following is a specification.

This invention relates to hack and similar saws and more particularly relates to an accessory that is adapted to be secured on to the ordinary hack saw so as to adapt the saw to work against a plane or flat surface.

Another object is to provide a blade-bowing member which can be removably and adjustably clamped on to the hack saw frame without necessitating a change in the construction of the ordinary hack saw. A further object is to provide a blade-bowing member supported from the yoke arms of the hack saw frame and adapted to engage the intermediate portion of the saw blade to bow out the same so as to enable the saw to work on a flat surface.

In the drawings:

Fig. 1 is a side elevation of the saw equipped with my improved form of blade bowing members.

Fig. 2 is a section on the line 2—2 of Fig. 1.

Fig. 3 is a detail in perspective of the blade-bowing arm.

Fig. 4 is a detail in perspective of the clamp.

Fig. 5 is a section on the line 5—5 of Fig. 2.

The yoke frame $a$ is arranged to take a pair of saw blade holders $b$ and $c$. These holders are provided with the inclined pins $d$ over which the saw blade $e$ is adapted to engage.

The yoke arms $f$ are provided with a plurality of recessed notches $g$ for a purpose that will hereinafter be described. A clamp preferably constructed as shown in Fig. 4 comprises the members $h$ hinged together and provided with squared holes $i$ and lugs $j$. The arms $k$ are provided with the squared lugs $m$ which are adapted to fit into the square holes $i$ when the clamp is secured in place. In assembling the clamp on to the yoke arms the arm $k$ is inserted between the hinged members $h$ of the clamp, the squared lugs $m$ fitted into the squared holes $i$. The clamp is then fitted around the yoke arms $f$, the projecting lug $j$ engaging in one of the recessed notches $g$ and a bolt and wing nut $n$ is adapted to bind the clamp around the yoke arm and thereby securely hold the same in place.

As shown in Fig. 1, the arm $k$ is adapted to project beyond the ends of the yoke arms and to engage the saw blade $e$ to bow out the same so that the intermediate portion of the saw blade will project beyond the ends of the yoke arms.

The recessed notches make possible the adjustment of the bowing members so as to vary the amount of bowing of the saw blade. The saw blade holders $b$ and $c$ are adjustable longitudinally with respect to the yoke-like frame member $a$ and thus the saw blade can be tightly drawn over the bowing members when the said bowing members are correctly adjusted and secured in place.

The back of the yoke-like frame is made in two pieces provided with slots and lugs $o$ which interlock. When the back breaks on the pivot $p$ the two parts may be slid along to lengthen the distance between the yoke arms and the slots and lugs engaged together again to lock the two parts of the frame in place. Obviously, when the saw blade is used in the ordinary manner by engaging the blade over the pins $r$ causing the saw blade to lie in a plane parallel to the blade of the yoke frame, the distance between the arms of the yoke needs to be greater than when the blade bowing members are used and the saw blade positioned at right angles to the plane of the frame.

What I claim is:

1. A hack saw, having in combination, a yoke like frame, saw blade holders secured to the ends of the yoke arms and longitudinally adjustable with respect to the yoke-like frame, and arms removably clamped to the yoke arms of the frame and wholly supported therefrom, said arms adapted to project beyond the ends of the yoke and engage an intermediate portion of the blade for bowing out the same for the purpose specified.

2. A hack saw, having in combination, a yoke like frame, saw blade holders secured to the ends of the yoke arms and longitudinally adjustable with respect to the yoke like frame and a pair of clamps removably secured to the yoke arms of the frame and each having secured therewith a downwardly projecting arm wholly supported therefrom adapted to project beyond the ends of the yoke and engage an intermediate portion of the blade for bowing out the same for the purpose specified.

3. A hack saw, having in combination, a yoke like frame, saw blade holders secured to the ends of the yoke arms, hinged clamps adapted to be secured around the yoke arms and provided with squared holes, and arms provided with lugs arranged to fit in said squared holes, said clamps arranged to clamp said arms to said yoke arms, the said arms adapted to project beyond the ends of the yoke and engage an intermediate portion of the blade for bowing out the same for the purpose specified.

4. A hack saw, having in combination, a yoke-like frame, saw blade holders secured to the ends of the yoke arms and longitudinally adjustable with respect to the yoke-like frame, and arms removably and adjustably clamped to the yoke arms of the frame and wholly supported therefrom, said arms adapted to project beyond the ends of the yoke and engage an intermediate portion of the blade for bowing out the same for the purpose specified.

5. A hack saw, having in combination a yoke-like frame, saw blade holders secured to the ends of the yoke arms and longitudinally adjustable with respect to the yoke-like frame, the said yoke arms provided with a plurality of notches, and a pair of clamps removably secured to the yoke arms and provided with projecting lugs adapted to engage one of the notches in the yoke arm to take the thrust, each clamp having secured therewith a downwardly projecting arm wholly supported therefrom, and adapted to project beyond the ends of the yoke and engage an intermediate portion of the blade for bowing out the same for the purpose specified.

In testimony whereof I affix my signature.

HARRY B. KIMMEL.